United States Patent
Eathakota (10) Patent No.: US 11,244,528 B2
(45) Date of Patent: Feb. 8, 2022

(54) SYSTEM OF CONDITIONAL ACCESS WHERE ACCESS IS GRANTED TO OTHER USERS WHEN PRIMARY ACCESSOR IS PRESENT IN ROOM

(71) Applicant: CARRIER CORPORATION, Palm Beach Gardens, FL (US)

(72) Inventor: Hrishi Eathakota, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/255,218

(22) PCT Filed: Jun. 3, 2019

(86) PCT No.: PCT/US2019/035134
§ 371 (c)(1),
(2) Date: Dec. 22, 2020

(87) PCT Pub. No.: WO2020/005465
PCT Pub. Date: Jan. 2, 2020

(65) Prior Publication Data
US 2021/0272403 A1   Sep. 2, 2021

(30) Foreign Application Priority Data
Jun. 30, 2018   (IN) .............................. 201811024453

(51) Int. Cl.
*H04N 7/14*   (2006.01)
*G07C 9/28*   (2020.01)
(Continued)

(52) U.S. Cl.
CPC ........... *G07C 9/28* (2020.01); *G07C 9/00571* (2013.01); *H04W 4/029* (2018.02);
(Continued)

(58) Field of Classification Search
CPC .. G07C 9/28; G07C 9/00571; G07C 2209/64; G07C 2009/00349; G07C 2209/04; H04W 4/029
See application file for complete search history.

(56) References Cited

U.S. PATENT DOCUMENTS 7,149,625 B2   12/2006   Mathews et al.
7,221,928 B2   5/2007   Laird et al.
(Continued)

FOREIGN PATENT DOCUMENTS

| CN | 101619983 A | 1/2010 |
| CN | 106780232 A | 5/2017 |

(Continued)

OTHER PUBLICATIONS

International Search Report issued in Application No. PCT/US2019/035134 dated Aug. 21, 2019, 6 pages.
(Continued)

*Primary Examiner* — Munear T Akki
(74) *Attorney, Agent, or Firm* — Cantor Colburn LLP (57) ABSTRACT

A method of determining access in an access control system is provided. The method including: receiving an access request to a first access control from a subordinate individual; determining a location of a superior individual; and deciding whether to actuate the first access control in response to the location of the superior individual.

12 Claims, 3 Drawing Sheets

(51) Int. Cl.
*G07C 9/00* (2020.01)
*H04W 4/029* (2018.01)

(52) U.S. Cl.
CPC .............. *G07C 2009/00349* (2013.01); *G07C 2209/04* (2013.01); *G07C 2209/64* (2013.01)

(56) References Cited

U.S. PATENT DOCUMENTS

| | | | |
|---|---|---|---|
| 7,821,986 B2 | 10/2010 | Thomson et al. | |
| 8,117,041 B1 | 2/2012 | Khan et al. | |
| 8,126,424 B2 | 2/2012 | Piett et al. | |
| 8,315,792 B2 | 11/2012 | Speier et al. | |
| 8,509,803 B2 | 8/2013 | Gracieux | |
| 9,666,000 B1* | 5/2017 | Schoenfelder | G07C 9/257 |
| 10,685,516 B1* | 6/2020 | Raduchel | H04M 3/537 |
| 2004/0124977 A1* | 7/2004 | Biffar | G06Q 10/08 340/539.13 |
| 2006/0116816 A1 | 6/2006 | Chao et al. | |
| 2006/0170533 A1* | 8/2006 | Chioiu | G07C 9/27 340/5.61 |
| 2007/0216764 A1* | 9/2007 | Kwak | G07C 9/00309 348/14.06 |
| 2011/0191021 A1 | 8/2011 | Jeong et al. | |
| 2013/0329047 A1 | 12/2013 | Jankowski et al. | |
| 2014/0051425 A1* | 2/2014 | Ahearn | H04W 12/06 455/420 |
| 2014/0058778 A1 | 2/2014 | McLarty et al. | |
| 2014/0266573 A1* | 9/2014 | Sullivan | G07C 9/00571 340/4.32 |
| 2014/0333412 A1* | 11/2014 | Lewis | H04W 12/06 340/5.2 |
| 2016/0123747 A1 | 5/2016 | Takeuchi | |
| 2017/0223005 A1* | 8/2017 | Birgisson | H04L 63/0807 |
| 2017/0287242 A1 | 10/2017 | Meganathan | |
| 2017/0370735 A1 | 12/2017 | Salowitz | |
| 2019/0340853 A1* | 11/2019 | Manuse | G07C 9/28 |
| 2020/0302716 A1* | 9/2020 | Raduchel | G07C 9/00309 |

FOREIGN PATENT DOCUMENTS

| | | |
|---|---|---|
| EP | 3200161 A1 | 8/2017 |
| WO | 2017180388 A1 | 10/2017 |

OTHER PUBLICATIONS

Written Opinion issued in Application No. PCT/US2019/035134 dated Aug. 21, 2019, 7 pages.

\* cited by examiner

SYSTEM OF CONDITIONAL ACCESS WHERE ACCESS IS GRANTED TO OTHER USERS WHEN PRIMARY ACCESSOR IS PRESENT IN ROOM

BACKGROUND

The subject matter disclosed herein generally relates to the field of access control systems, and more particularly to an apparatus and method for operating access control systems.

Existing access controls may allow an individual to unlock rooms via a key card and/or mobile device if the individual is authorized to access the room. Blanket authorization to rooms may create unintended access to rooms that need a level of supervision. In a University, Hotel, or Commercial space there may be private access areas with restricted access (e.g., classrooms). Access to these private access areas may only be given to a Primary User, such as, for example, a Professor, Manager or a Supervisor. However, other users may also need to access this private access area, thus requiring the other users to walk up to a front desk to request that the front desk manually grant access, which is time consuming.

BRIEF SUMMARY

According to one embodiment, a method of determining access in an access control system is provided. The method including: receiving an access request to a first access control from a subordinate individual; determining a location of a superior individual; and deciding whether to actuate the first access control in response to the location of the superior individual.

In addition to one or more of the features described above, or as an alternative, further embodiments may include: commanding the first access control to actuate when the location of the superior individual is within a room secured by the first access control.

In addition to one or more of the features described above, or as an alternative, further embodiments may include: commanding the first access control to actuate when the location of the superior individual is within a selected distance of a room secured by the first access control.

In addition to one or more of the features described above, or as an alternative, further embodiments may include that determining a location of a superior individual further includes: receiving an access request to the first access control from the superior individual; and calculating a location of the superior individual in response to a time of the access request to the first access control from the superior individual and a time of the access request to the first access control from the subordinate individual.

In addition to one or more of the features described above, or as an alternative, further embodiments may include that determining a location of a superior individual further includes: receiving an access request to a second access control from the superior individual; and calculating a location of the superior individual in response to a time of the access request to the second access control from the superior individual and a time of the access request to the first access control from the subordinate individual.

In addition to one or more of the features described above, or as an alternative, further embodiments may include: determining a location of a superior individual further includes: detecting a wireless signal emitted from a mobile device being carried by the superior individual using one or more access controls; determining a signal strength of the wireless signal emitted from the mobile device between the mobile device and each of the one or more access controls; and determining the location of the mobile device in response to the signal strength determined between the mobile device and each of the one or more access controls.

In addition to one or more of the features described above, or as an alternative, further embodiments may include that determining a location of a superior individual further includes: detecting a wireless signal emitted from a mobile device being carried by the superior individual using one or more wireless access protocol devices; determining a signal strength of the wireless signal emitted from the mobile device between the mobile device and each of the one or more wireless access protocol devices; and determining the location of the mobile device in response to the signal strength determined between the mobile device and each of the one or more wireless access protocol devices.

In addition to one or more of the features described above, or as an alternative, further embodiments may include that determining the location of a superior individual is determined using a global positioning system According to another embodiment, a computer program product tangibly embodied on a computer readable medium is provided. The computer program product including instructions that, when executed by a processor, cause the processor to perform operations including: receiving an access request to a first access control from a subordinate individual; determining a location of a superior individual; and deciding whether to actuate the first access control in response to the location of the superior individual.

In addition to one or more of the features described above, or as an alternative, further embodiments may include that the operations further include: commanding the first access control to actuate when the location of the superior individual is within a room secured by the first access control.

In addition to one or more of the features described above, or as an alternative, further embodiments may include that the operations further include: commanding the first access control to actuate when the location of the superior individual is within a selected distance of a room secured by the first access control.

In addition to one or more of the features described above, or as an alternative, further embodiments may include that determining a location of a superior individual further includes: receiving an access request to the first access control from the superior individual; and calculating a location of the superior individual in response to a time of the access request to the first access control from the superior individual and a time of the access request to the first access control from the subordinate individual.

In addition to one or more of the features described above, or as an alternative, further embodiments may include that determining a location of a superior individual further includes: receiving an access request to a second access control from the superior individual; and calculating a location of the superior individual in response to a time of the access request to the second access control from the superior individual and a time of the access request to the first access control from the subordinate individual.

In addition to one or more of the features described above, or as an alternative, further embodiments may include that determining a location of a superior individual further includes: detecting a wireless signal emitted from a mobile device being carried by the superior individual using one or more access controls; determining a signal strength of the wireless signal emitted from the mobile device between the mobile device and each of the one or more access controls; and determining the location of the mobile device in response to the signal strength determined between the mobile device and each of the one or more access controls.

In addition to one or more of the features described above, or as an alternative, further embodiments may include that determining a location of a superior individual further includes: detecting a wireless signal emitted from a mobile device being carried by the superior individual using one or more wireless access protocol devices; determining a signal strength of the wireless signal emitted from the mobile device between the mobile device and each of the one or more wireless access protocol devices; and determining the location of the mobile device in response to the signal strength determined between the mobile device and each of the one or more wireless access protocol devices.

In addition to one or more of the features described above, or as an alternative, further embodiments may include that determining the location of a superior individual is determined using a global positioning system.

Technical effects of embodiments of the present disclosure include determining access to an access control for one individual based upon activity of a second individual.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Access to these private access areas may only be given to a Primary User, such as, for example, a Professor, Manager or a Supervisor. However, other secondary users may also need to access this private access area, thus requiring the other users to walk up to a front desk to request that the front desk manually grant access, which is time consuming. Embodiments disclosed herein seek to address the need for a way to automatically grant access to intended secondary users if a certain level of supervision set by the primary user of the room is met.

Figure 1:
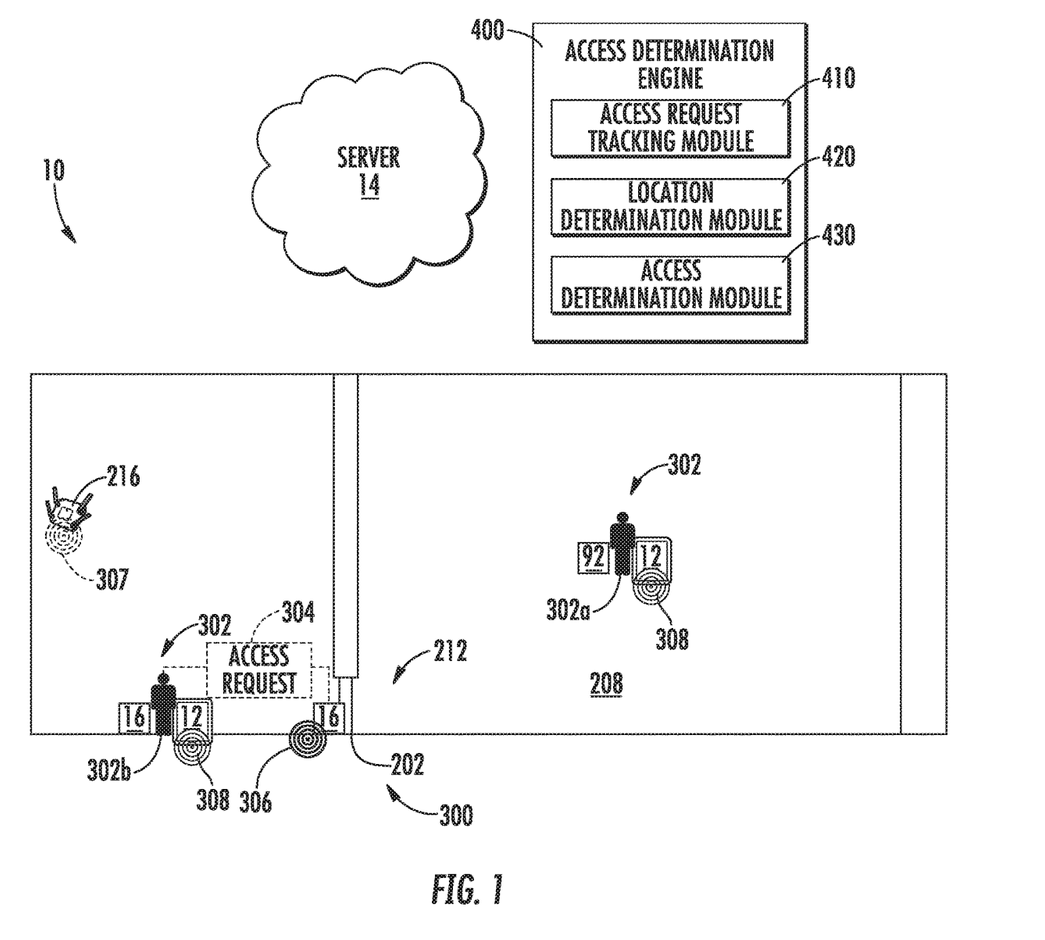
FIG. 1 illustrates a general schematic system diagram of an access control system, in accordance with an embodiment of the disclosure.

FIG. 1 schematically illustrates an access control system 10. The system 10 generally may include a mobile device 12, a key card 92, a server 14, a wireless access protocol device 216, and an access control 16. The access control system 10 may include any number of mobile devices 12, key cards 92, servers 14, wireless access protocol devices 216, and access controls 16. It should be appreciated that, although particular systems are separately defined in the schematic block diagrams, each or any of the systems may be otherwise combined or separated via hardware and/or software. In the illustrated embodiment, the access controls 16 may control access through/past an impediment 202. For instance, the impediment 202 may be a door, a turnstile, a gate, a garage, or any known impediment known to one of skill in the art. The access control system 10 may include any number of impediments 202. In an example, the access control 16 may be a door lock on a door controlling access to a room 208 and thus the door is the impediment 202.

A physical key card 92 or mobile device 12 belonging to an individual 302 may be granted access to one or more access controls 16 (e.g. the door lock on an office, hotel room or classroom assigned to the individual) that control access to an impediment 202. In one example, when an individual 302 begins working at a new building their mobile device 12 or key card 92 will be granted access to access controls 16 operably connected to impediments 202 of rooms/buildings where they are allowed to enter and/or work. In another example, when an individual 302 checks into the hotel room their mobile device 12 or key card 92 will be granted access to an access control 16 that locks the room 208. In yet another example, an individual 302 may be granted access to a classroom or study room however that access may be conditioned on whether a teacher is already in the room. In yet another example, a subordinate individual 302b may be granted access to say a room in an office premises, only if the superior individual 302a is present in the room 208. There may be one or more key cards 92 or mobile devices 12 authorized to actuate an access control 16 (e.g. a husband and a wife in a hotel; multiple workers in a collaborative workspace; multiple students in a school).

An individual 302 may utilize their key card 92 to unlock and/or lock an access control 16 by inserting the key card 92 into the access control 16, placing the key card 92 proximate to the access control 16, or swiping the key card 92 through the access control 16. An individual 302 may utilize their mobile device 12 to unlock and/or lock the access control 16 operably connected to their assigned room through an access request 304. The mobile device 12 may store credentials to unlock and/or lock the access control 16. Some credentials may be used for multiple access controls 16. For example, an access control 16 operably connected to a hotel room of the individual 302 and an access control 16 operably connected to a hotel pool may respond to the same credential of the individual 302. In another example, an access control 16 operably connected to a first classroom and an access control 16 operably connected to a second classroom may respond to the same credential of the individual 302. Other credentials may be specific to a single access control 16.

The mobile device 12 is a wireless capable handheld device such as a smartphone that is operable to communicate with the server 14 and the access controls 16. Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may transmit an access request 304 to the access control 16 by short-range radio transmission when the mobile device 12 is placed proximate the access control 16. The mobile device 12 may have to be within a selected range of the access control 16 in order to utilize short-range wireless communication. For example, the selected range may be manually set by an individual 302 as a chosen range or automatically set based on the limitations of hardware associated with the mobile device 12 and/or the access control 16 or may be manually set by the Hotel/Office/University Management. Wireless communication may occur between the mobile device 12 and the access control 16 via RFID or any other short-range wireless communication method known to one of skill in the art. An access request 304 transmitted from the mobile device 12 may be transmitted manually by an individual 302 through an application on the mobile device 12 and/or automatically when the mobile device 12 is within a selected range of the access control 16.

Each access control 16 is a wireless-capable, restricted-access, or restricted-use device such as wireless locks, access control readers for building entry, and other restricted-use machines. The mobile device 12 or key card 92 submits credentials to the access controls 16, thereby selectively permitting an individual 302 to actuate (i.e., access or activate) functions of the access controls 16. An individual may, for example, submit a credential to an electromechanical lock to unlock it, and thereby gain access to a room or area past the impediment 202. In another embodiment, the access control 16 may be composed of a reader and the reader passes the credential read from the key card 92 or mobile device 12 to a controller that then commands an impediment 202 to be opened. The controller may be the server 14 or located on the server 14. In yet another embodiment, the mobile device 12 communicates to the server 14 the credential, which then communicates to the access control 16 to indicate the credential or a command to unlock the access control 16. In any case, the mobile device 12 and/or key card 92 can be used to actuate the access control 16.

The server 14 may be local and/or cloud based. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through the mobile device 12.

The system 10 may include an access determination engine 400 configured to determine access for a subordinate individual 302b to an access control 16 at the destination 212 based upon the location of a superior individual 302a. In an example, the superior individual 302a may be a teacher and a subordinate individual 302b may be a student. The access determination engine 400 is comprised of modules 410, 420, 430 including an access request tracking module 410; a location determination module 420; and an access determination module 430. Each module 410, 420, 430 may be located on either the mobile device 12 or the server 14. Alternatively, the modules 410, 420, 430 may be distributed between the mobile device 12 and the server 14.

The access request tracking module 410 is configured to receive and save access requests 304 from an individual 302. The access request 304 may be from a key card 92 (e.g., swiping the key card 92 through the access control 16 or placing the key card 92 in close proximity to the access control 16) or a mobile device 12 belonging to an individual.

The access request 304 requests access to a specific access control 16. The access request 304 will include a credential identifying the individual 302 to the access control 16. For instance, a superior individual 302a may request access to a specific access control 16 located at destination 212 in order to gain access to the destination 212. The access request tracking module 410 receives the access request 304 and saves details of the access request 304 including: a timestamp of the access request 304 indicating when the access request 304 was received; a credential of the individual 302 that transmitted the access request 304; and a verdict whether or not access was granted to the individual 302.

The location determination module 420 is configured to determine a location of the individual 302. The location of the individual 302 may be determined by the timing of an access request 304 at an access control 16 and calculated walking time away from the access control 16. For instance, a superior individual 302a may transmit an access request 304 to an access control 16 at a destination 212 associated with a room 208 only three minutes ago, thus it may be determined that the superior individual 302a is still located with the room 208 since only three minutes have passed. The location of the individual 302 may be automatically determined by a location of the mobile device 12 being carried by the individual 302. The location of the mobile device 12 may be determined through a global positioning system (GPS) or other wireless signal detection using at least one of the mobile device 12, the access controls 16, and the wireless access protocol devices 216. The wireless signal detection may include detecting the signal strength of the wireless signal at different locations and triangulating the location based upon the signal strength.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine a location of the mobile device 12 in response to a signal strength of the wireless signal 306.

The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a location of the mobile device 12 in response to a signal strength of the wireless signal 307.

The location of the mobile device 12 may also be determined using the wireless access protocol device 216 and/or the access controls 16 to detect a signal advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a location data of the mobile device 12 in response to a signal strength of the wireless signal 308. The location of the mobile device 16 may be triangulated by relaying up to the location determination module 420 the strength of each wireless signal 308 detected and then the location determination module 420 can triangulate the position.

Wireless signal interaction data between the mobile device 12 and at least one of the access device 16 and the wireless access protocol device 216 may transmitted to the server 14 to determine a location of the mobile device 12. In an embodiment, the location determination module 420 may be located on the server 14 and may be used to determine a location of the mobile device 12. The server 14 may use signal strength detected between the mobile device 12, access controls 16, and the wireless access protocol device 216 to determine a location of the mobile device 12.

The access determination module 430 may determine whether or not to allow a subordinate individual 302b to actuate the access control 16 at the destination 202 in response to a location of a superior individual 302a. The access determination module 430 may have a policy to identify if the access request 304 is indeed being made by an intended user, in this case a subordinate individual 302b. The access determination module 430 may have a policy where the subordinate individual 302b is not allowed to enter the room 208 until the superior individual 302a is within the room 208. For example, students may not be allowed to enter a classroom until a teacher is within the classroom. The access determination module 430 may have a policy where the subordinate individual 302b is not allowed to enter the room 208 until the superior individual 302a is within a selected distance of the room 208. For example, the teacher may be on their way to a classroom and thus the students may enter the classroom when the teacher is within a selected distance of the classroom. As mentioned above, a location of the superior individual 302a may be determined based upon the actual location of the superior individual (i.e., through wireless signal tracking) or through location prediction in response to access requests 304 sent to access controls 16. For instance, a teacher may be determined to be in the building and on their way to the classroom based on an access request 304 sent within the last few minutes to an access control 16 operably connected to the front door of the school.

Figure 2:
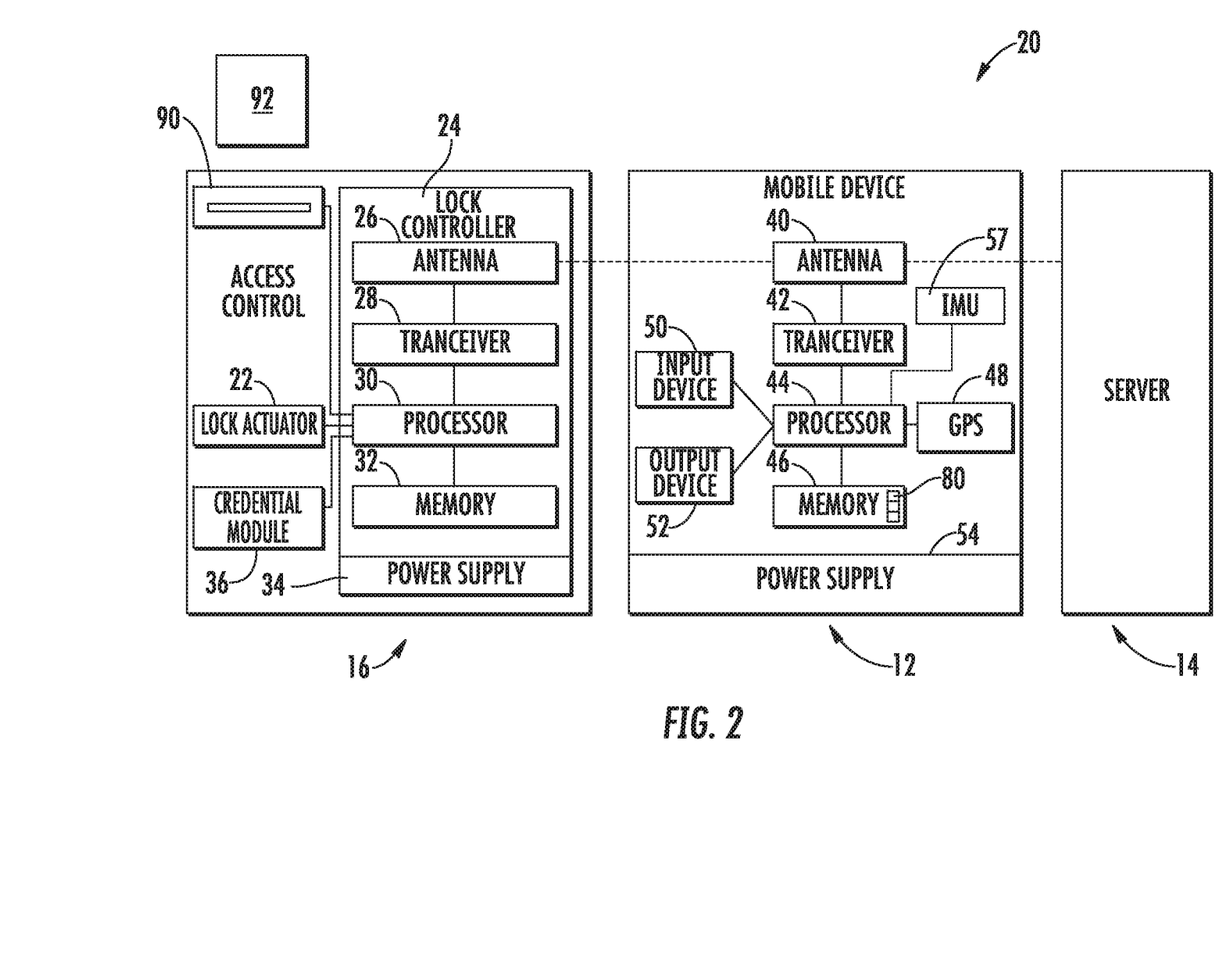
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 including the access control 16, the mobile device 12, key card 92, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment/enrollment for the individual 302 possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components, such as, for example, a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an inertial measurement unit (IMU) sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
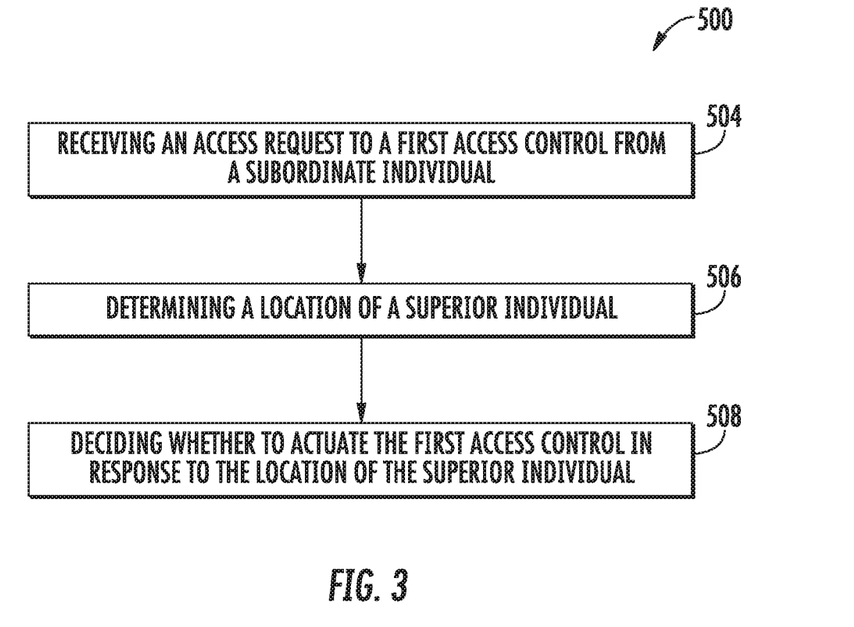
FIG. 3 is a flow diagram illustrating a method of determining access to an access control for an individual, according to an embodiment of the present disclosure.

Referring now to FIG. 3 with continued reference to FIGS. 1-2. FIG. 3 shows a flow chart of method 500 of determining access in an access control system 10. The method 500 may be performed by the mobile device 12 and/or the server 14. At block 504, an access request 304 to a first access control 16 is received from a subordinate individual 302b. The access request 304 may be from a key card 92 or a mobile device 12 belonging to the individual, as described above. The first access control 16 may control access past an impediment 202 where a subordinate individual 302b is scheduled to meet a superior individual 302a.

At block 506, a location of the superior individual 302a is determined. The location of the superior individual 302a may be determined using access requests 304. In one example, the location of the superior individual 302a may be determined by: receiving an access request 304 to the first access control 16 from the superior individual 302a; and calculating a location of the superior individual 302a in response to a time of the access request 304 to the first access control 16 from the superior individual 302a and a time of the access request 304 to the first access control 16 from the subordinate individual 302b. The first access control 16 may be located at the destination 212. In another example, the location of the superior individual 302a may also be determined by: receiving an access request 304 to a second access control 16 (i.e., the second access control 16 being different than the first access control 16) from the superior individual 302a; and calculating a location of the superior individual 302a in response to a time of the access request 304 to the second access control 16 from the superior individual 302a and a time of the access request 304 to the first access control 16 from the subordinate individual 302b. The second access control may be located at a location different from the destination 212.

The location of the superior individual 302a may also be determined using wireless tracking and/or a GPS. In one example, the location of the superior individual 302a may also be determined by: detecting a wireless signal 308 emitted from a mobile device 12 being carried by the superior individual 302a using one or more access controls 16; determining a signal strength of the wireless signal 308 emitted from the mobile device 12 between the mobile device 12 and each of the one or more access controls 16; and determining the location of the mobile device 12 in response to the signal strength determined between the mobile device 12 and each of the one or more access controls 16. In another example, the location of the superior individual 302a may also be determined by: detecting a wireless signal 308 emitted from a mobile device 12 being carried by the superior individual 302a using one or more wireless access protocol devices 216; determining a signal strength of the wireless signal 308 emitted from the mobile device 12 between the mobile device 12 and each of the one or more wireless access protocol devices 216; and determining the location of the mobile device 12 in response to the signal strength determined between the mobile device 12 and each of the one or more wireless access protocol devices 216.

At block 508, it is decided whether to actuate the first access control 16 in response to the location of the superior individual 302a. The first access control 16 may be commanded to actuate when the location of the superior individual is within a room 208 secured by the first access control 16. The first access control 16 may be commanded to actuate when the location of the superior individual 302a is within a selected distance of a room 208 secured by the first access control 16. When the location of the superior individual 302a is within a selected distance of a room 208 secured by the first access control 16, it may be determined that the superior individual 302a will arrive at the room 208 within a period of time based upon average or predicted walking speed. The predicted walking speed may be specific to the superior individual 302a or a general average walking speed of individuals 302.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of determining access in an access control system, the method comprising:
   receiving an access request at a first access control from a subordinate individual;
   determining a location of a superior individual using at least a mobile device being carried by the superior individual; and
   deciding, using an access determination engine, whether to actuate the first access control in response to the location of the superior individual, the access determination engine being located on the mobile device or on a server,
   wherein determining the location of the superior individual further comprises
      detecting a wireless signal emitted from a mobile device being carried by the superior individual using one or more wireless devices;
      determining a signal strength of the wireless signal emitted from the mobile device between the mobile device and each of the one or more wireless devices; and
      determining the location of the mobile device in response to the signal strength determined between the mobile device and each of the one or more wireless devices,
      wherein the one or more wireless devices include:
         one or more access controls; or
         one or more wireless access protocol devices.

2. The method of claim 1, further comprising:
   commanding the first access control to actuate when the location of the superior individual is within a room secured by the first access control.

3. The method of claim 1, further comprising:
   commanding the first access control to actuate when the location of the superior individual is within a selected distance of a room secured by the first access control.

4. The method of claim 1, wherein determining the location of the superior individual further comprises:
   receiving an access request to the first access control from the superior individual; and
   calculating the location of the superior individual in response to a time of the access request to the first access control from the superior individual and a time of the access request to the first access control from the subordinate individual.

5. The method of claim 1, wherein determining the location of the superior individual further comprises:
   receiving an access request to a second access control from the superior individual; and
   calculating the location of the superior individual in response to a time of the access request to the second access control from the superior individual and a time of the access request to the first access control from the subordinate individual.

6. The method of claim 1, wherein determining the location of the superior individual is determined using a global positioning system in addition to the one or more wireless devices.

7. A computer program product tangibly embodied on a non-transitory computer readable medium, the computer program product including instructions that, when executed by a processor, cause the processor to perform operations comprising:
   receiving an access request at a first access control from a subordinate individual;
   determining a location of a superior individual using at least a mobile device being carried by the superior individual; and
   deciding, using an access determination engine, whether to actuate the first access control in response to the location of the superior individual, the access determination engine being located on the mobile device or on a server,
   wherein determining the location of the superior individual further comprises
      detecting a wireless signal emitted from a mobile device being carried by the superior individual using one or more wireless devices;
      determining a signal strength of the wireless signal emitted from the mobile device between the mobile device and each of the one or more wireless devices; and
      determining the location of the mobile device in response to the signal strength determined between the mobile device and each of the one or more wireless devices,
      wherein the one or more wireless devices include:
         one or more access controls; or
         one or more wireless access protocol devices.

8. The computer program product of claim 7, wherein the operations further comprise:
   commanding the first access control to actuate when the location of the superior individual is within a room secured by the first access control.

9. The computer program product of claim 7, wherein the operations further comprise:
   commanding the first access control to actuate when the location of the superior individual is within a selected distance of a room secured by the first access control.

10. The computer program product of claim 7, wherein determining the location of the superior individual further comprises:
    receiving an access request to the first access control from the superior individual; and
    calculating the location of the superior individual in response to a time of the access request to the first access control from the superior individual and a time of the access request to the first access control from the subordinate individual.

11. The computer program product of claim 7, wherein determining the location of the superior individual further comprises:
    receiving an access request to a second access control from the superior individual; and
    calculating the location of the superior individual in response to a time of the access request to the second access control from the superior individual and a time of the access request to the first access control from the subordinate individual.

12. The computer program product of claim 7, wherein determining the location of the superior individual is determined using a global positioning system in addition to the one or more wireless devices.

* * * * *